US 6,671,337 B1

(12) United States Patent
Cordoba

(10) Patent No.: US 6,671,337 B1
(45) Date of Patent: Dec. 30, 2003

(54) CARRIER MODULATOR FOR USE IN A TRANSMITTER OR TRANSCEIVER

(75) Inventor: Jose Luis Cordoba, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 593 days.

(21) Appl. No.: 09/696,928

(22) Filed: Oct. 25, 2000

(51) Int. Cl.[7] .............................. H04L 27/08; H04B 1/38
(52) U.S. Cl. ........................................ 375/345; 375/219
(58) Field of Search ................................. 375/345, 219, 375/295, 297, 376, 373, 346, 306; 455/138, 139, 136

(56) References Cited

U.S. PATENT DOCUMENTS

| 4,333,060 A | * | 6/1982 | Mosley et al. .............. 331/1 A |
| 5,020,076 A | | 5/1991 | Cahill et al. ................... 375/5 |
| 5,471,652 A | | 11/1995 | Hulkko ......................... 455/76 |
| 5,511,236 A | * | 4/1996 | Umstattd et al. ............. 455/76 |
| 5,596,600 A | * | 1/1997 | Dimos et al. ............... 375/148 |
| 5,825,813 A | | 10/1998 | Na .............................. 375/219 |
| 5,835,850 A | * | 11/1998 | Kumar ..................... 455/67.14 |
| 5,894,592 A | | 4/1999 | Brueske et al. ............... 455/86 |
| 6,384,677 B2 | * | 5/2002 | Yamamoto ................... 330/10 |

FOREIGN PATENT DOCUMENTS

EP          0998088 A      5/2000

* cited by examiner

*Primary Examiner*—Khai Tran
(74) *Attorney, Agent, or Firm*—Michael Schmitt

(57) ABSTRACT

A transmitter has a quadrature modulator that provides a modulated signal at a first frequency. The transmitter has a phase locked loop of which a voltage controlled oscillator is coupled between a phase comparator of the phase locked loop and further has a transmit power amplifier in a transmit signal path of the transmitter. The phase locked loop further has a down-converter in a feedback path from an output of the transmit power amplifier and a feedback input of the phase comparator. The transmitter further has an amplitude restoration arrangement that restores amplitude information contained in a feedback signal provided by the down-converter and in the quadrature modulated signal. In operation, the phase locked loop replicates at a carrier frequency angle information contained in the quadrature modulated signal, and the amplitude restoration arrangement controls the gain of the transmit power amplifier such that input signals at the phase comparator substantially are equal.

23 Claims, 2 Drawing Sheets

CARRIER MODULATOR FOR USE IN A TRANSMITTER OR TRANSCEIVER

BACKGROUND OF THE INVENTION

1. Field of the Invention

The present invention relates to a modulator for use in a transmitter or a transceiver, more particularly to a modulator for multiple modulation systems.

2. Description of the Related Art

U.S. Pat. No. 5,020,076 discloses a hybrid carrier modulator for a hybrid telephone having both digital and analog transmission circuits. The hybrid modulator has a first modulator for modulating a digital circuit and a second modulator for modulating an analog signal. The first modulator is a π/4-shift DPSK (Differential Quadrature Phase Shift Keying) modulator that modulates in-phase (I) and quadrature (Q) vector sources. After modulation, the quadrature modulated signals are mixed in a balanced quadrature mixer section with a carrier frequency provided by an oscillator, the I-signal being mixed with the oscillator signal and the Q-signal being mixed with a 90° shifted oscillator signal. The resulting signals from these two operations are then added at a summer to produce a carrier modulated signal that is nominally centered at the carrier frequency. The oscillator is the VCO (Voltage Controlled Oscillator) portion of a PLL (Phase Locked Loop) that also provides a transmit-IF (Intermediate Frequency) signal for FM (Frequency Modulation) when the modulator is operating in an analog mode. By modulating the PLL with an analog signal, which may include a voice signal, the PLL will produce a FM signal. In U.S. Pat. No. 5,020,076 thus a hybrid modulator is provided with a combined quadrature carrier modulator that alternatively modulates a digitally modulated quadrature signal or an analog transmit-IF signal.

SUMMARY OF THE INVENTION

It is an object of the invention to provide a universal carrier modulator for use in a transmitter or a transceiver, i.e., a modulator that is suitable for multiple modulation systems.

It is another object to provide a low cost and simple modulator.

It is another object of the invention to provide a carrier modulator that rejects undesired harmonics produced in an amplitude restoration feedback loop and/or mixer products generated in an intermediate frequency quadrature transmit mixer.

In accordance with the invention a carrier modulator is provided comprising:

- a quadrature modulator configured to provide a quadrature modulated signal at a first frequency;
- a power amplifier providing a carrier modulator output signal at a second frequency, said power amplifier having a variable gain;
- a phase locked loop comprising a phase comparator and a transmit local oscillator for generating a carrier signal at said second frequency, a first input of said phase comparator being coupled to said quadrature modulator and said transmit oscillator being coupled between said phase comparator and said power amplifier,
- said phase locked loop further comprising a down-converter configured to down-convert said carrier modulator output signal to a feedback signal at said first frequency, said feedback signal being coupled to a second input of said phase comparator, said phase locked loop thereby replicating at said second frequency of angle information comprised in said quadrature modulated signal; and
- an amplitude restoration arrangement for restoring from said quadrature modulated signal and said feedback signal of amplitude information comprised in said quadrature modulated signal, said amplitude restoration arrangement providing a variable gain control signal to said power amplifier until said feedback signal becomes substantially equal to said quadrature modulated signal.

The invention is based on the insight that a simple quadrature modulator can be used to easily generate any type of modulation at a low intermediate frequency, e.g. 40–150 MHz, and that then a common carrier modulator a high carrier frequency, e.g. 825 MHz, can replicate the modulated signal by separation of angle and amplitude information in the modulated signal and can replicate the separated angle and restore the amplitude information at the high carrier frequency. It has been recognized that the simply modulated signal forms a reference signal for the feedback loop.

In an embodiment of the carrier modulator the phase locked loop has a signal coupler that couples a part of the carrier modulated output signal to the down-converter in the feedback loop, with sufficient attenuation to eventually reconstruct the modulation signal at the low intermediate frequency.

In a preferred embodiment respective band pass filters are provided between an output of the down-converter and a feedback input of the phase comparator and between the quadrature modulator and an input of the phase detector. Herewith undesired harmonics are rejected that are produced by the down-converter and mixing products are rejected that are generated by the quadrature mixer.

The simple quadrature modulator can be any type of transmit modulator such as a DQPSK (Differential Quadrature Phase Shift Keying) modulator for use in a TDMA (Time Division Multiple Access) system as defined in US Standard IS54/136, a GMSK (Gaussian Minimum Shift Keying) modulator as defined in the European GSM (Global System for Mobile Communications) Standard, an 8-DQPSK modulator as defined in the 3G EDGE (Enhanced Data Rate for Global Evolution) Standard, or any other type of quadrature modulator at a low frequency.

In an embodiment the amplitude restoration arrangement has two envelope detectors, one of the envelope detectors detecting the feedback signal and another one of the envelope detectors detecting the simply generated modulate at the low intermediate frequency, and a comparator for comparing output signals of the envelope detectors and for generating a gain control signal for the transmit power amplifier. Herewith in the controlled feedback loop distortion in the transmit branch is eliminated and a substantially replicated modulated signal is obtained at the carrier frequency.

Because of having a voltage controlled oscillator in the transmit signal path of which an output is coupled to the transmit power amplifier, no further mixers are needed in the transmit path and thus there is no need for transmit filters in the signal path between the quadrature modulator and the transmit power amplifier. Such further mixers and transmit filters would be needed in conventional carrier modulators. The carrier modulator according to the invention can thus lead to a higher chip integration level. In addition thereto, because less severe linearity requirements are to be imposed on the transmit power amplifier, the transmit power amplifier can be made cheaper and can be operated at a higher efficiency. Operation at a higher efficiency leads to a highly desired reduction of battery power when the carrier modulator is used in a portable apparatus such as a cellular phone.

BRIEF DESCRIPTION OF THE DRAWING

Throughout the figures the same reference numerals are used for the same features.

DESCRIPTION OF THE DETAILED EMBODIMENTS

Figure 1:
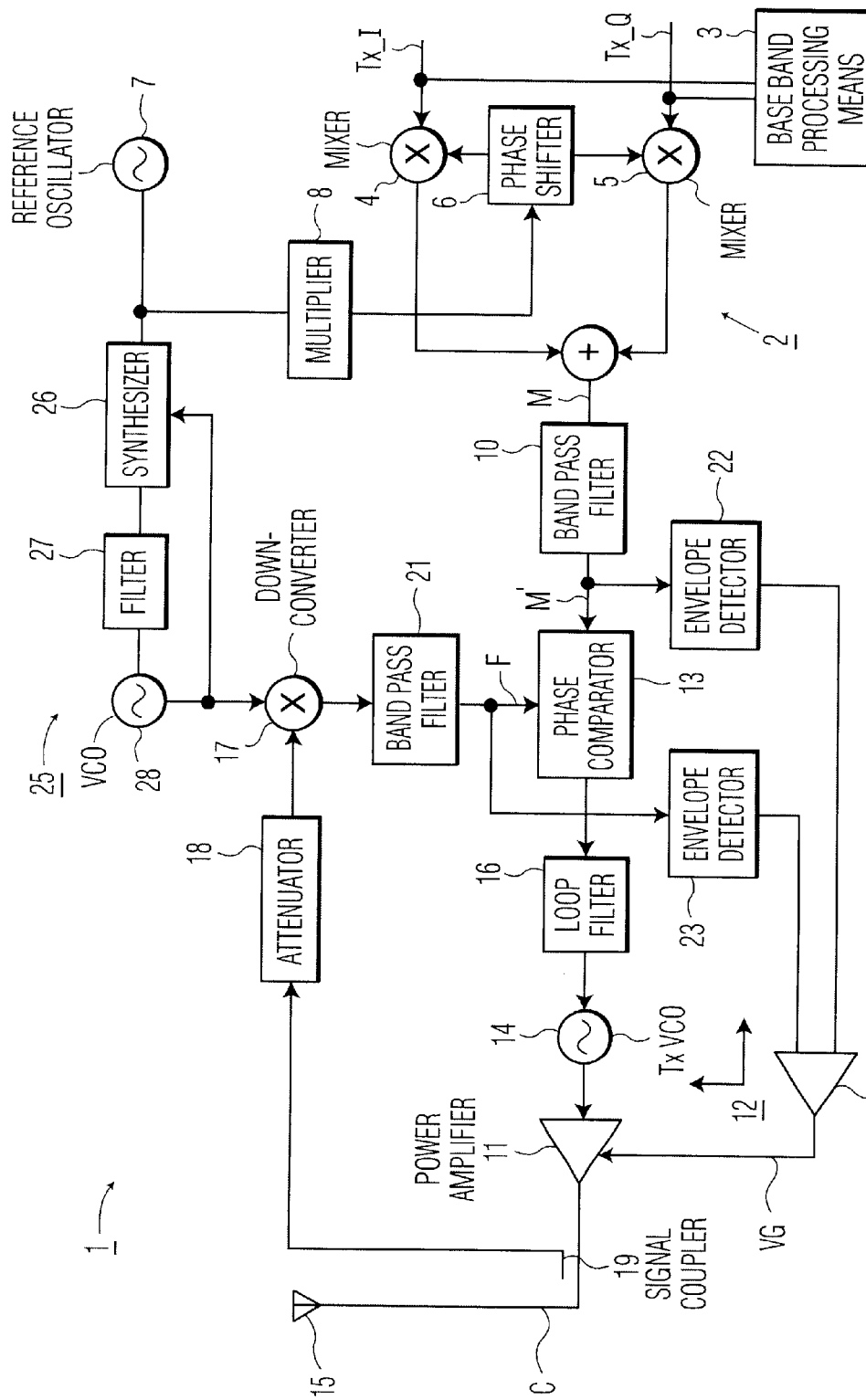
FIG. 1 is a block diagram of a transmitter according to the invention.

FIG. 1 is a block diagram of a transmitter 1 according to the invention. In case of a transceiver, a receiver (not shown in detail here) is also provided. The receiver may be any suitable type of receiver. The transmitter 1 comprises a quadrature modulator 2 that, in combination with base band processing means 3, is configured to generate a quadrature modulated signal M at a low intermediate frequency, e.g. 40–150 MHz, from a pair of quadrature transmit signals Tx_I and Tx_Q provided by the base band processing means 3. The quadrature modulator 2 has a pair of quadrature mixers 4 and 5 and a 90° relative phase shifting network 6. The phase shifting network 6 is coupled to a reference oscillator 7 via a frequency multiplier 8 that multiplies the frequency of an output signal of the reference oscillator 7. At output side, the quadrature modulator 2 is coupled to a band pass filter 10 that rejects undesired mixer products generated by the quadrature modulator 2. The transmitter 2 further comprises a variable gain amplifier 11 and a fast phase locked loop 12 comprising a phase comparator 13 and a transmit local oscillator 14 (TxVCO) that is coupled between an output of the phase comparator 13 and an input of the transmit power amplifier 11. In an embodiment, the transmit power amplifier provides a carrier modulated signal to an antenna 15. The phase locked loop 12 further comprises a loop filter 16 that is coupled between an output of the phase comparator 13 and a control input of the TxVCO 14, a down-converter 17, an attenuator 18, and a signal coupled 19. The signal coupler 19 couples a part of a carrier modulator output signal C to an input of the down-converter 17. The attenuator 18 sufficiently attenuates the coupled part of the carrier modulator output signal such that a reconstructed quadrature modulated signal at low intermediate frequency is obtained in the feedback path provided by the phase locked loop 12 to the phase comparator 13.

The transmitter 1 further comprises an amplitude restoration arrangement 20 for restoring from the quadrature modulated signal M and a feedback signal F provided by a band pass filter 21 that is coupled between an output of the down-converter 17 and a feedback input of the phase comparator 13, of amplitude information comprised in the quadrature modulated signal M. In an embodiment, the amplitude restoration arrangement 20 comprises envelope detectors 22 and 23 and a comparator 24 that compares output signals generated by the envelope detectors 22 and 23 and that provides a variable gain control signal VG to a variable gain control input of the transmit power amplifier 11.

Figure 2:
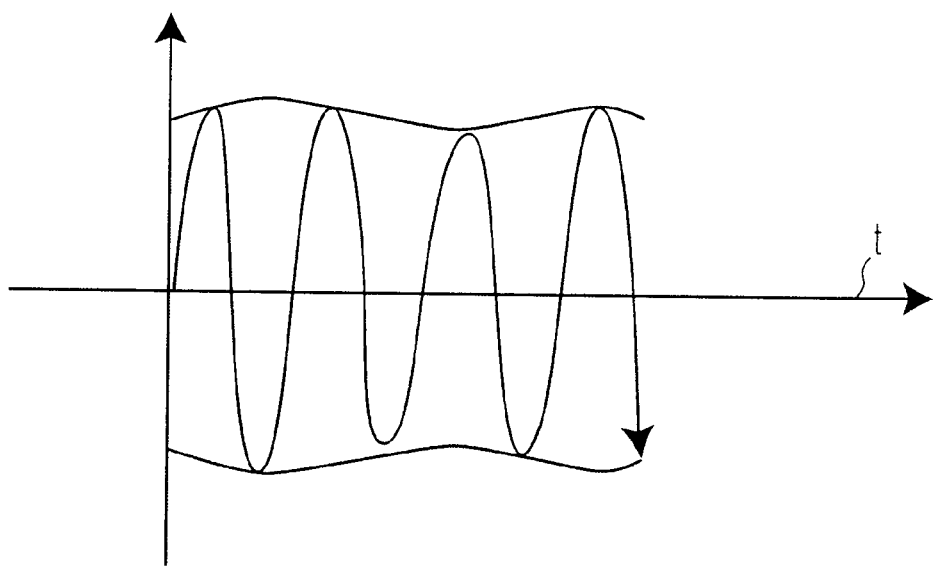
FIG. 2 shows a quadrature-modulated signal at an intermediate frequency in a transmitter according to the invention.

FIG. 2 shows a filtered quadrature modulated signal M', generated as a QPSK signal for instance, such a signal containing amplitude and phase information as shown.

Figure 3:
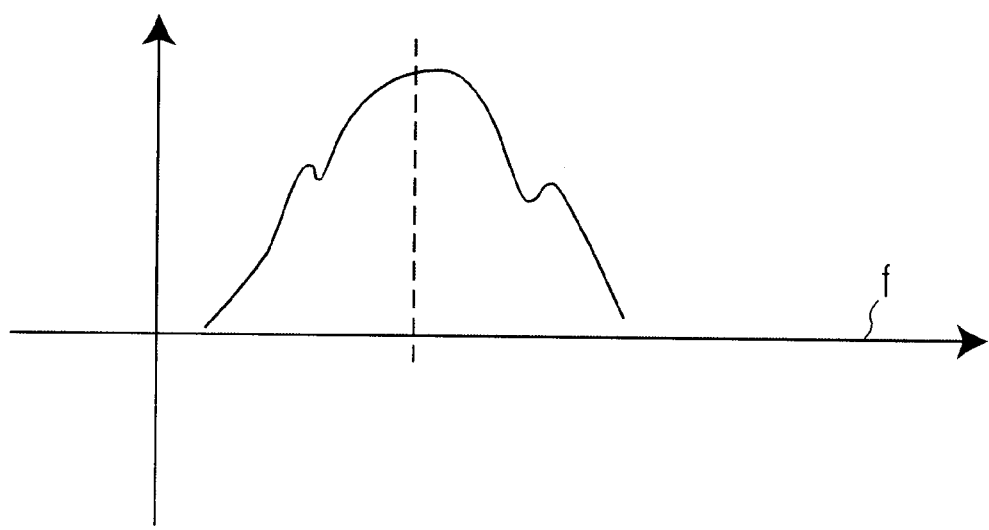
FIG. 3 shows a frequency spectrum of the quadrate modulated signal.

FIG. 3 shows a frequency spectrum of the signal M', and, in a controlled feedback loop, of the feedback signal F. In a controlled feedback loop the feedback signal F is substantially equal to the signal M'.

In operation, the fast phase locked loop 12 tracks angle information, i.e., frequency and/or phase information in the signal M', and replicates the tracked angle information at the output of the TxVCO 14 and thus at the antenna 15. The amplitude restoration arrangement 20 obtains amplitude information from both the signals M' and F and controls the gain of the transmit power amplifier 11 such that the signal F matches the signal M'. The attenuator 18 should provide an attenuation, or attenuation in the feedback path should be sufficient, such that in a controlled state the signals M' and F substantially have the same amplitude. The bandwidth of the PLL 12 and the amplitude loop formed by the restoration arrangement 20 should be large enough to contain all significant frequency components of the desired signal so as to avoid spectrum re-growth. Preferably, the transmit signal is sampled after the transmit power amplifier 11 so as to compensate for any amplitude-to-phase modulation in the frequency loop.

The transmitter 1 further comprises conventional frequency generation means 25 comprised of a frequency synthesizer 26, a filter 27 and a VCO 28. Such a conventional frequency generation means 25 can be any suitable means.

In summary, the invention thus provides a carrier modulator that can easily generate any type of modulation at a carrier frequency, by replicating at the carrier frequency of an output signal of a simple carrier modulator that is generated at a much lower frequency, thereby using a frequency loop and an amplitude loop.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A carrier modulator comprising:
   a quadrature modulator configured to provide a quadrature modulated signal at a first frequency;
   a power amplifier providing a carrier modulator output signal at a second frequency, said power amplifier having a variable gain;
   a phase locked loop comprising a phase comparator and a transmit local oscillator for generating a carrier signal at said second frequency, a first input of said phase comparator being coupled to said quadrature modulator and said transmit oscillator being coupled between said phase comparator and said power amplifier,
   said phase locked loop further comprising a down-converter configured to down-convert said carrier modulator output signal to a feedback signal at said first frequency, said feedback signal being coupled to a second input of said phase comparator, said phase locked loop thereby replicating at said second frequency of angle information comprised in said quadrature modulated signal; and
   an amplitude restoration arrangement for restoring from said quadrature modulated signal and said feedback signal of amplitude information comprised in said quadrature modulated signal, said amplitude restoration arrangement providing a variable gain control signal to said power amplifier until said feedback signal becomes substantially equal to said quadrature modulated signal.

2. A carrier modulator as claimed in claim 1, wherein said phase locked loop further comprises a signal coupler for coupling a part of said carrier modulator output signal to said down-converter.

3. A carrier modulator as claimed in claim 2, wherein said signal coupler comprises an attenuator.

4. A carrier modulator as claimed in claim 1, further comprising a frequency generator for generating a local oscillator signal that is provided to said down-convertor.

5. A carrier modulator as claimed in claim 4, further comprising a reference oscillator that provides a reference oscillator signal to said frequency generator.

6. A carrier modulator as claimed in claim 5, further comprising a frequency multiplier, and said quadrature modulator comprises a pair of quadrature mixers, said frequency multiplier being coupled between said reference oscillator and said pair of quadrature mixers.

7. A carrier modulator as claimed in claim 1, comprising a first band pass filter coupled between said quadrature modulator and said phase comparator.

8. A carrier modulator as claimed in claim 1, wherein said phase locked loop comprises a second band pass filter that is coupled between said down-converter and said phase comparator and a loop filter that is arranged between said phase comparator and said transmit local oscillator.

9. A carrier modulator as claimed in claim 1, wherein said amplitude restoration arrangement comprises a first envelope detector detecting said quadrature modulated signal, a second envelope detector detecting said feedback signal, and a comparator providing said variable gain control signal, said comparator being coupled to said first and second envelope detectors.

10. A transmitter with a carrier modulator, said carrier modulator comprising:
a quadrature modulator configured to provide a quadrature modulated signal at a first frequency;
a power amplifier providing a carrier modulator output signal at a second frequency, said power amplifier having a variable gain;
a phase locked loop comprising a phase comparator and a transmit local oscillator for generating a carrier signal at said second frequency, a first input of said phase comparator being coupled to said quadrature modulator and said transmit oscillator being coupled between said phase comparator and said power amplifier,
said phase locked loop further comprising a down-converter configured to down-convert said carrier modulator output signal to a feedback signal at said first frequency, said feedback signal being coupled to a second input of said phase comparator, said phase locked loop thereby replicating at said second frequency of angle information comprised in said quadrature modulated signal; and
an amplitude restoration arrangement for restoring from said quadrature modulated signal and said feedback signal of amplitude information comprised in said quadrature modulated signal, said amplitude restoration arrangement providing a variable gain control signal to said power amplifier until said feedback signal becomes substantially equal to said quadrature modulated signal.

11. A transmitter as claimed in claim 10, wherein said phase locked loop further comprises a signal coupler for coupling a part of said carrier modulator output signal said down-converter.

12. A transmitter as claimed in claim 11, wherein said signal coupler comprises an attenuator.

13. A transmitter as claimed in claim 10, further comprising a frequency generator for generating a local oscillator signal that is provided to said down-convertor.

14. A transmitter as claimed in claim 13, further comprising a reference oscillator that provides a reference oscillator signal to said frequency generator.

15. A transmitter as claimed in claim 14, further comprising a frequency multiplier, and said quadrature modulator comprises a pair of quadrature mixers, said frequency multiplier being coupled between said reference oscillator and said pair of quadrature mixers.

16. A transmitter as claimed in claim 10, wherein said amplitude restoration arrangement comprises a first envelope detector detecting said quadrature modulated signal, a second envelope detector detecting said feedback signal, and a comparator providing said variable gain control signal, said comparator being coupled to said first and second envelope detectors.

17. A transceiver with a carrier modulator, said carrier modulator comprising:
a quadrature modulator configured to provide a quadrature modulated signal at a first frequency;
a power amplifier providing a carrier modulator output signal at a second frequency, said power amplifier having a variable gain;
phase locked loop comprising a phase comparator and a transmit local oscillator for generating a carrier signal at said second frequency, a first input of said phase comparator being coupled to said quadrature modulator and said transmit oscillator being coupled between said phase comparator and said power amplifier,
said phase locked loop further comprising a down-converter configured to down-convert said carrier modulator output signal to a feedback signal at said first frequency, said feedback signal being coupled to a second input of said phase comparator, said phase locked loop thereby replicating at said second frequency of angle information comprised in said quadrature modulated signal; and
an amplitude restoration arrangement for restoring from said quadrature modulated signal and said feedback signal of amplitude information comprised in said quadrature modulated signal, said amplitude restoration arrangement providing a variable gain control signal to said power amplifier until said feedback signal becomes substantially equal to said quadrature modulated signal.

18. A transceiver as claimed in claim 17, wherein said phase locked loop further comprises a signal coupler for coupling a part of said carrier modulator output signal to said down-converter.

19. A transceiver as claimed in claim 18, wherein said signal coupler comprises an attenuator.

20. A transceiver as claimed in claim 17, further comprising a frequency generator for generating a local oscillator signal that is provided to said down-convertor.

21. A transceiver as claimed in claim 20, further comprising a reference oscillator that provides a reference oscillator signal to said frequency generator.

22. A transceiver as claimed in claim 21, further comprising a frequency multiplier, and said quadrature modulator comprises a pair of quadrature mixers, said frequency multiplier being coupled between said reference oscillator and said pair of quadrature mixers.

23. A transceiver as claimed in claim 17, wherein said amplitude restoration arrangement comprises a first envelope detector detecting said quadrature modulated signal, a second envelope detector detecting said feedback signal, and a comparator providing said variable gain control signal, said comparator being coupled to said first and second envelope detectors.

* * * * *